(12) United States Patent
Nakamura (10) Patent No.: US 6,930,846 B2
(45) Date of Patent: Aug. 16, 2005

(54) MAGNETIC RECORDING APPARATUS AND SYSTEM FOR DRIVING A MAGNETIC RECORDING MEDIUM

(75) Inventor: Kimio Nakamura, Kokubunji (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 10/694,016

(22) Filed: Oct. 28, 2003

(65) Prior Publication Data

US 2004/0257688 A1 Dec. 23, 2004

(30) Foreign Application Priority Data

Jun. 23, 2003 (JP) .......................... 2003-178667

(51) Int. Cl.$^7$ ................................................ G11B 5/09
(52) U.S. Cl. ........................................... 360/46; 360/68
(58) Field of Search ............................ 360/46, 66–68, 360/75; 324/210, 212

(56) References Cited

U.S. PATENT DOCUMENTS

| | | | | |
|---|---|---|---|---|
| 5,812,337 A | * | 9/1998 | Tanaka et al. ............ 360/73.12 |
| 5,867,334 A | * | 2/1999 | Soichi et al. .................. 360/68 |
| 6,301,068 B1 | * | 10/2001 | Ionescu ......................... 360/68 |
| 6,466,386 B1 | * | 10/2002 | Dakroub ........................ 360/46 |
| 6,493,161 B1 | * | 12/2002 | Elliott et al. .................. 360/46 |
| 6,650,493 B2 | * | 11/2003 | Dakroub ........................ 360/46 |
| 6,710,956 B1 | * | 3/2004 | Dakroub ........................ 360/46 |

FOREIGN PATENT DOCUMENTS

JP     7-65303     8/1993

* cited by examiner

Primary Examiner—David Hudspeth
Assistant Examiner—Dismery Mercedes
(74) Attorney, Agent, or Firm—Reed Smith LLP; Stanley P. Fisher, Esq.; Juan Carlos A. Marquez, Esq.

(57) ABSTRACT

A magnetic recording apparatus suitable for high-density and high-frequency magnetic recording includes a recording head to the coil of which a recording current is supplied, the recording current having a waveform such that the conducting time length is shorter than the time length of a recording pattern.

6 Claims, 8 Drawing Sheets

MAGNETIC RECORDING APPARATUS AND SYSTEM FOR DRIVING A MAGNETIC RECORDING MEDIUM

BACKGROUND OF THE INVENTION

1. Technical Field

The present invention relates to a magnetic recording apparatus and magnetic recording method.

2. Background Art

Figure 10:
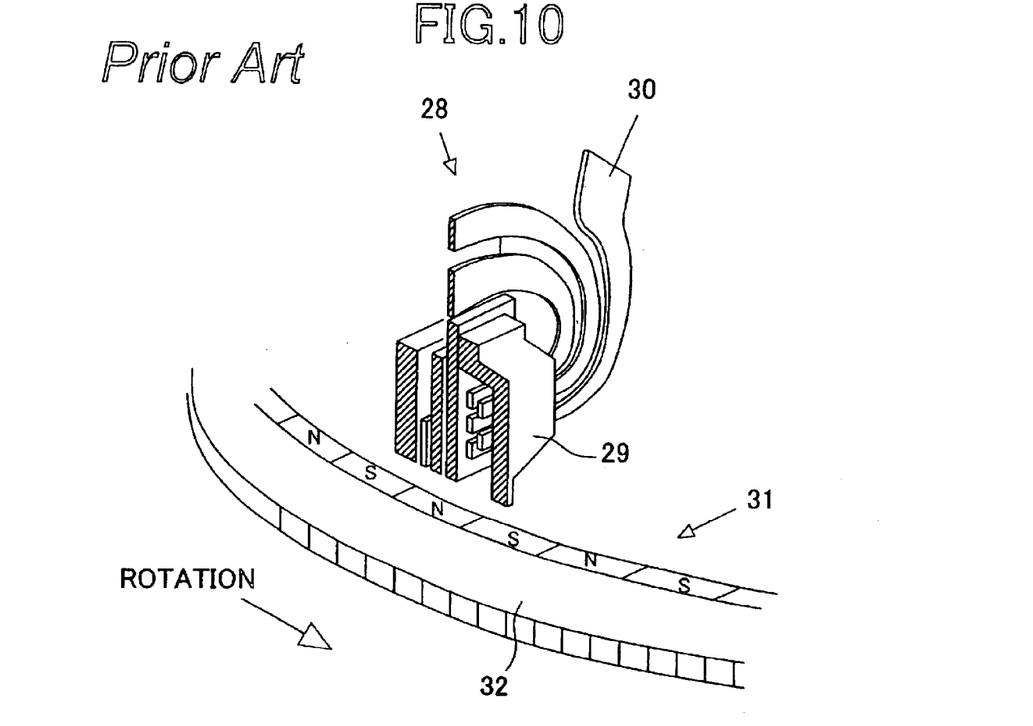
FIG. 10 shows the relationship between the recording head and the recording pattern on the magnetic disc.

In magnetic recording apparatuses as represented by magnetic disc apparatuses, recording is carried out by forming a magnetic pattern corresponding to a recording signal in a magnetic recording medium. The recording pattern is formed by applying a recording magnetic field using a recording head. As shown in FIG. 10, a recording head 28 includes a high-permeability recording pole 29 with a coil 30 wound thereon. A recording current is supplied to the coil 30 from a recording driver circuit. The current flowing in the coil 30 magnetizes the recording pole 29 to produce a recording magnetic field, by which a recording pattern 31 is formed in a magnetic disc 32. The strength of the recording magnetic field produced by the recording head 28 and the profile of the magnetic field, as well as the magnetic characteristics of the recording medium, are important factors that determine many characteristics relating to recording performance, such as the readout signal intensity, signal-to-noise ratio, and overwrite performance. The recording magnetic field is dependent on the intensity and waveform of the recording current, in addition to the material and structure of the recording head pole. Thus, in order to realize high-density recording in an optimized manner, it is necessary to optimize not only the magnetic characteristics of the magnetic recording medium and the recording head structure, but also the amplitude and waveform of the recording current.

In the prior art, one of the requirements to be satisfied concerning the recording current has been the ensuring of a recording current amplitude such that the strength of the recording magnetic field that is generated exceeds the magnetic field with which a magnetization pattern can be formed in the recording medium. Another requirement has been the provision of an overshoot at the rise portion of the current so as to reduce the inversion time of the recording magnetic field. The overshoot in the current waveform causes the pole in the head to be more strongly magnetized upon magnetization inversion, so that the magnetization inversion can take place faster. The reduction in the inversion time of the recording magnetic field is effective in forming a sharper boundary in the recording pattern and is therefore suitable for high-density or high-frequency recording. Accordingly, the current waveform in the prior art, such as one described in U.S. Pat. No. 6,301,068, is made up of a combination of a current waveform having a constant amplitude with an overshoot at the rise portion thereof. In this case, recording is optimized by adjusting the amplitude of the overshoot at the rise portion and the amplitude of the subsequent constant current.

Figure 11:
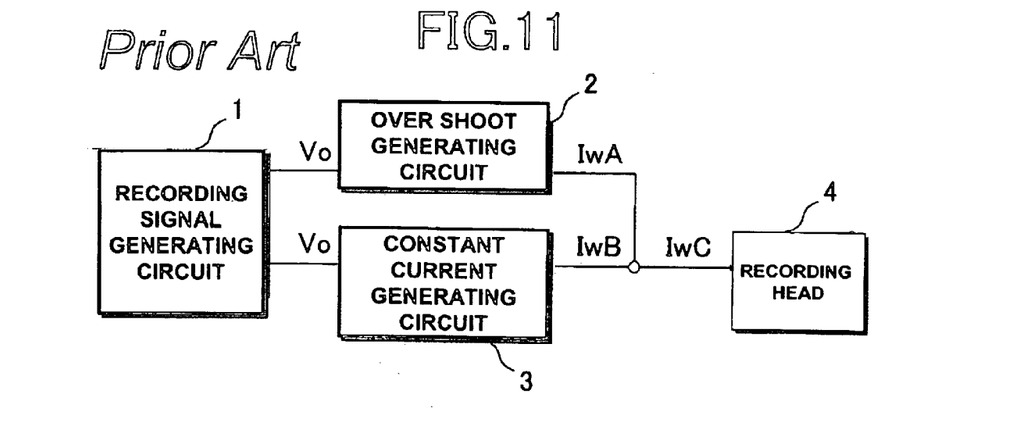
FIG. 11 shows a schematic diagram of the conventional recording current driver circuit.
Figure 12:
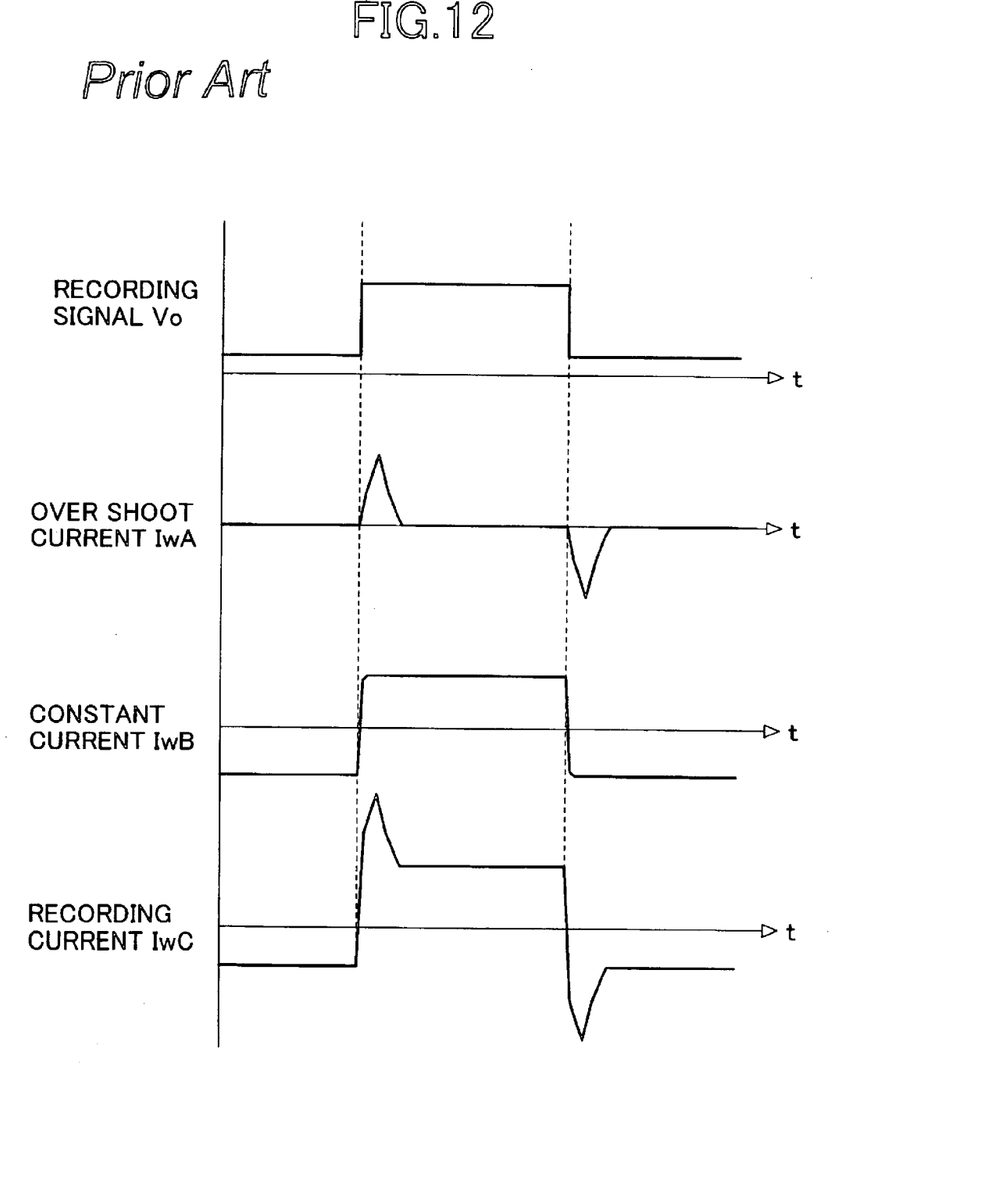
FIG. 12 shows the structure of the conventional recording current waveform.

FIG. 11 schematically shows a conventional recording current driver circuit. FIG. 12 shows a chart with reference to which the recording current waveform will be described. As shown in FIG. 11, the driver circuit for generating the recording current waveform includes a constant current generating circuit 3 for supplying a recording current IwB having a constant amplitude ensuring the formation of a magnetization pattern, and an overshoot generating circuit 2 for generating an overshoot current waveform IwA. The two current waveforms are summed at a timing corresponding to a recording signal Vo generated by a recording signal generating circuit 1. The resultant current waveform is then fed to a recording head 4. A recording current waveform IwC for forming one recording pattern has an overshoot at the head, followed by a continuation of a certain level of current amplitude, as shown in FIG. 12. The waveform continues with its polarity inverted in accordance with the recording timing of the subsequent pattern.

JP Patent Publication (Kokai) No. 7-65303 A (1995) discloses a magnetic recording system using a ring head, in which a recording current waveform includes a time period with a reduced current amplitude prior to polarity inversion so that S/N during recording and reading can be enhanced.

(Patent Document 1) U.S. Pat. No. 6,301,068

(Patent Document 2) JP Patent Publication (Kokai) No. 7-65303 A (1995)

SUMMARY OF THE INVENTION

There is currently a need for increasing the recording density and the recording frequency during magnetic recording. If the interval between recording patterns is reduced, the magnetization transition areas forming the boundary between the patterns are superposed, thereby reducing the amplitude of the readout signal. Thus, the boundary between the recording patterns must be sharply formed for improving the recording density. With regard to high-speed recording, the magnetization inversion speed must be increased. While these requirements are being dealt with by optimizing the magnetic characteristics of the recording medium or the head structure, or by reducing the distance between the head and the magnetic recording medium, they can also be dealt with by optimizing the current waveform.

Increasing the overshoot amplitude of the current waveform makes it possible to reduce the inversion time of the head magnetic field and also contributes to the formation of a sharp boundary between recording patterns on the magnetic recording medium and to high-frequency recording operation. On the other hand, it also leads to an increased danger of the head pole being excessively magnetized by a large current amplitude. Specifically, while the increase in overshoot amplitude helps to increase the magnetic field inversion speed, it can also cause an excessive magnetization after magnetic field inversion, which makes the magnetic field slope gentler. As the magnetic field slope becomes gentle, the boundary of the recorded patterns spreads, so that, when recording is carried out with a reduced recording interval, the boundaries of the recording patterns are superposed on one another. As a result, the signal amplitude upon readout decreases, which is not suitable for high-density recording. Thus, in the conventional current waveform, there is a tradeoff between an increase or decrease in the overshoot amplitude and the formation of a sharp boundary between recording patterns.

Further, an increase in the current amplitude also increases the power supplied to the head, so that the head may produce heat whereby the recording head could be subject to an increased risk of thermal-mechanical deformation. As a result, the distance between the recording head and the recording medium could vary and a normal recording operation could be hindered. The increase in the required power also puts a burden on the recording driver supplying the recording current, such that high-frequency operation of the recording driver could be prevented.

The method disclosed in JP Patent Publication (Kokai) No. 7-65303 A (1995) determines the duration of time of the current with a reduced amplitude based on the time in which the head passes the length of the pole gap in the ring head. Therefore, the method cannot be applied to the perpendicular recording system employing a single pole head having no gap.

It is therefore the object of the invention to provide a magnetic recording apparatus and magnetic recording method whereby recording is carried out using a current waveform effective for high-density and high-frequency recording.

Figure 1:
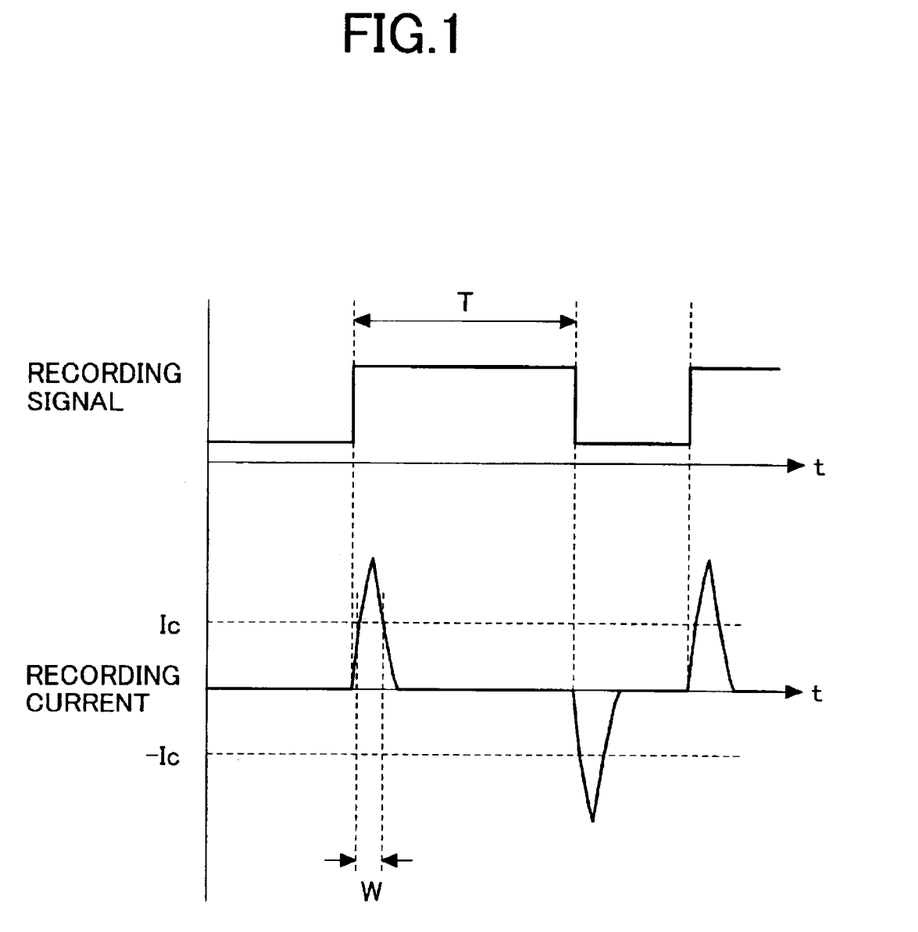
FIG. 1 shows a recording current waveform according to the invention.

Referring to FIG. 1, the recording current waveform used in the magnetic recording according to the invention will be described. The magnetic recording apparatus of the invention employs a current waveform such that a conducting time W in which a recording current 9 flowing in the coil of a recording head exceeds a current amplitude Ic at which a magnetic recording medium can be recorded is shorter than a time length T of a recording pattern. The current amplitude level between the fall of the pulse-shaped current amplitude and the rise of a subsequent, polarity-inverted current pulse is 0 mA or smaller than the magnetic recording medium-recordable current amplitude. The time length T of the recording pattern shown in FIG. 1 corresponds to the time required for the formation of one recording pattern. Namely, it is the time interval of current polarity switching. In the conventional recording current waveform (see IwC in FIG. 12), the conducting time length corresponds to the recording pattern. In contrast, in the current waveform of the invention, the conducting time is reduced as compared with the conventional cases, so that the power supply to the head can be reduced. Such a current waveform with a limited conducting time is generated in synchronism with the switching timing of a recording pattern signal such that the polarity alternates.

Figure 2:
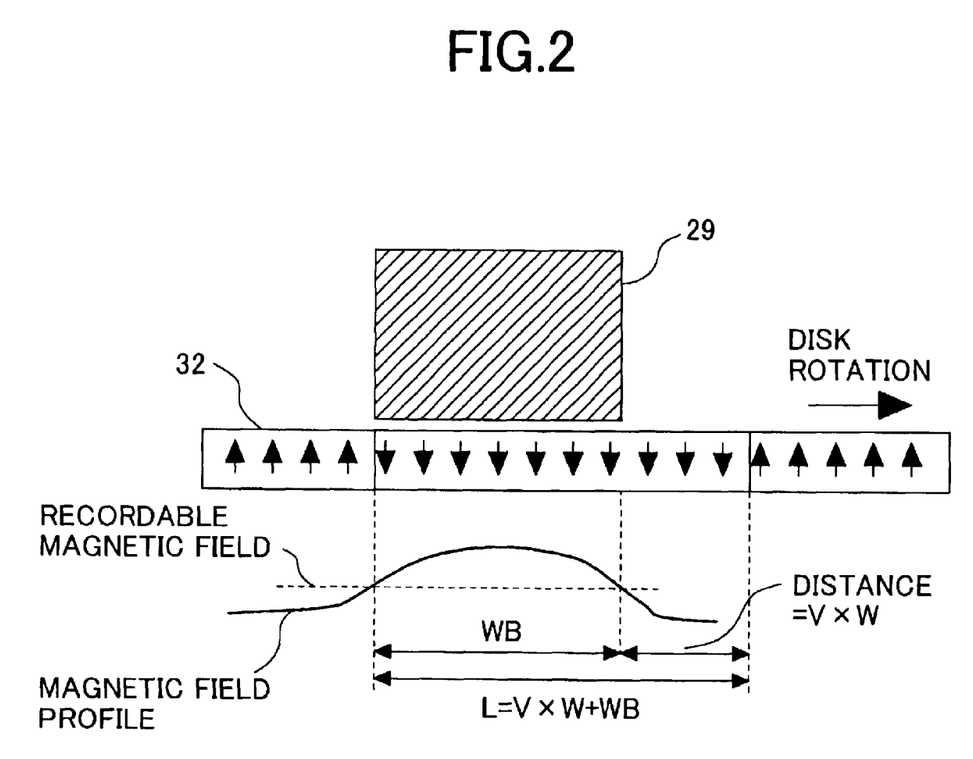
FIG. 2 shows the relationship between the write bubble size and the recording pattern length.

In the recording current waveform according to the invention, the conducting time W in which the recordable current amplitude is exceeded can be defined by using a write bubble size WB as a parameter. FIG. 2 shows the relationship between the write bubble size WB and the recording pattern length. As shown in FIG. 2, the write bubble size WB is the length of the head magnetic field profile along the center of the recording track which exceeds the recordable magnetic field strength enabling the formation of the recording pattern, upon application of a recording magnetic field (head magnetic field) from the recording pole 29 of the recording head to the magnetic disc 32. The write bubble size WB corresponds to the length of the gap in the recording head pole in the case of longitudinal recording. In the case of perpendicular magnetic recording, in which a single pole head including a main pole and a return pole is used, it corresponds to the length of the main pole of the single pole head.

As it is presumed that the delay of the recording magnetic field that rises in response to the rise of the recording current with respect to the recording current is small, namely not more than 0.1 ns, the time length in which the head magnetic field is generated can be considered to be substantially equal to the conducting time of the current. The length L of the magnetization pattern that is recorded is the sum of the distance (W×v) traveled by the recording head in the conducting time W in which the recordable current amplitude is exceeded and the write bubble size WB (W×v+WB). v is the transport speed of the recording head. No unrecorded state is produced as long as the magnetization pattern length L exceeds the distance (T×v) of travel of the recording head in the time length T of the recording pattern. Accordingly, the conducting time W can be made shorter than the time length T of the recording pattern in accordance with the write bubble size WB. Thus, in accordance with the invention, the conducting time W of the current waveform in which the magnetic-recordable current amplitude is exceeded is set such that a relationship T>W>T−WB/v is satisfied.

The write bubble size is several times longer in perpendicular recording than it is in longitudinal recording. Thus, the application of the current waveform of the invention to the perpendicular recording system is particularly effective.

When the conducting time W is made constant regardless of the length of the recording pattern, a maximum pattern time length Tmax will be the reference, and the conducting time W of the current waveform in which the recordable current amplitude is exceeded is set such that a relationship Tmax>W>Tmax−WB/v is satisfied.

In this case, if the recording pattern time length T is reduced such that W>T, the portion of the waveform in which the current amplitude is reduced will be eliminated. Thus, the effect of the invention in such a case would be expected up to this pattern time length.

In the conventional recording current waveform, the recording current flows continuously during the entire time length the recording pattern. In the present invention, however, the time in which the current with a recordable current wavelength flows is limited to the time W. In the remaining time, either no recording current flows or a recording current with a less-than-recordable current amplitude flows. As a result, the power supplied to the recording head during the time corresponding to one recording pattern can be reduced. Thus, the power supplied to the recording head can be reduced even when the intensity of the current amplitude contributing to fast magnetic field inversion is the same as that of the conventional current waveform. This makes it possible to avoid the excessive magnetization of the head poles and contributes to high-density recording. Further, the reduction in the power supply to the head leads to a reduction in the amount of heat generated in the head, thereby preventing the deterioration of recording performance due to mechanical deformation of the head. Furthermore, the current supply circuit of the recording driver is made up of a pulse waveform generating block and can therefore be simplified, so that the current supply circuit can be adapted for high frequencies effectively.

The write bubble size depends on the structure of the recording head, the magnetic characteristics of the magnetic recording medium, and the distance between the recording head and the recording medium. By providing the recording current driver with a function for setting the time length of the recording current, modifications in the recording head, recording medium, or the maximum pattern size can be accommodated.

Thus, in accordance with the invention, high-density and high-frequency recording can be achieved without requiring changes in the magnetic characteristics of the magnetic recording medium or the structure of the recording head, or without particularly reducing the distance between the magnetic head and the magnetic recording medium.

DETAILED DESCRIPTION OF THE PREFERRED EMBODIMENTS

The invention will be hereafter described by way of an embodiment with reference made to the drawings.

Figure 3:
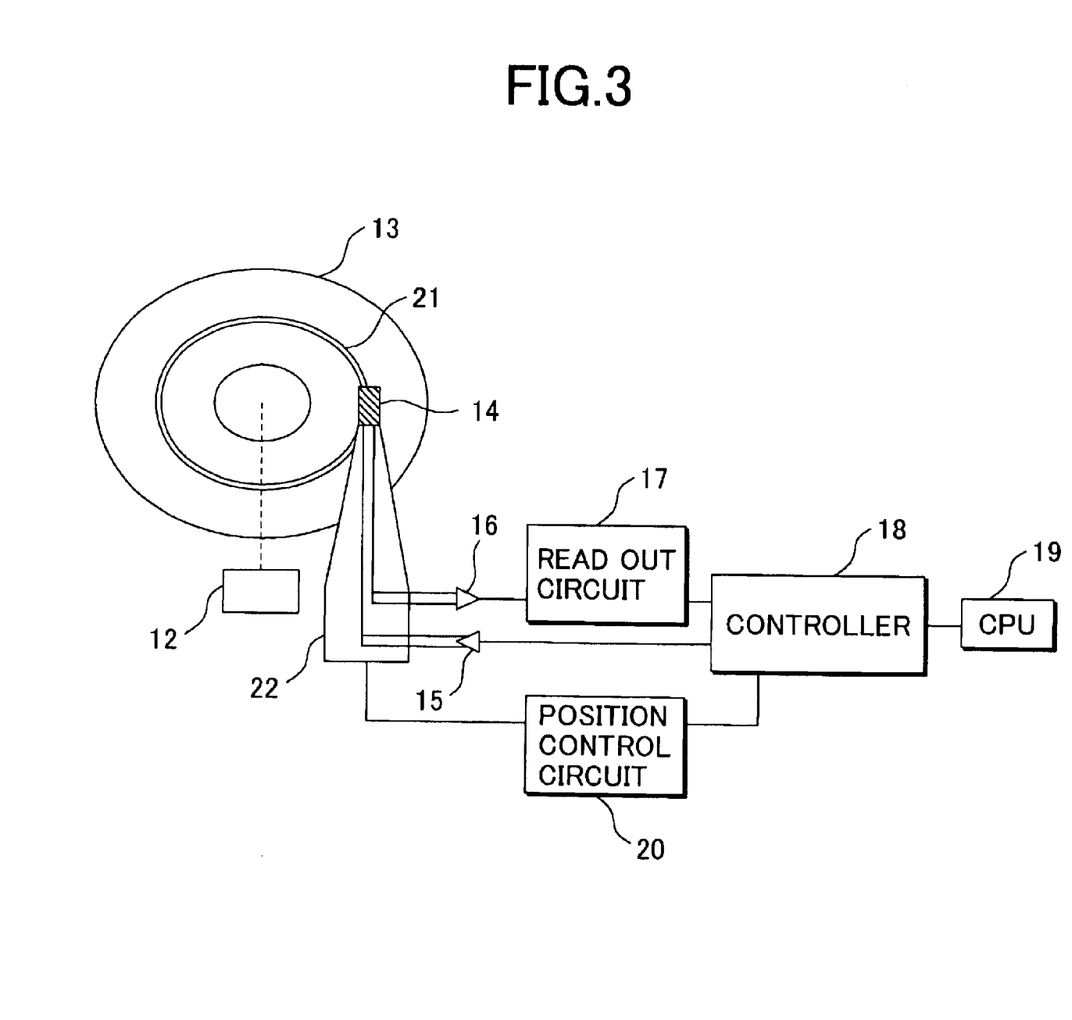
FIG. 3 schematically shows a magnetic recording apparatus.

FIG. 3 shows a block diagram of an example of the magnetic recording apparatus according to the invention. The magnetic recording apparatus is of a known structure including a magnetic recording medium 13 rotated by a motor 12 for recording magnetic information, a magnetic head 14 mounting a recording head for recording information on the magnetic recording medium and a read head for reproduction. The apparatus also includes a recording driver 15 for supplying a recording current to the recording head, a preamplifier 16 and a readout circuit 17 for detecting and processing a signal from the read head, a controller 18, and a CPU 19. The recording head mounted on the magnetic head 14 is a single pole head having a main pole and an return pole. The magnetic recording medium 13 is a perpendicular magnetic recording medium made of a nonmagnetic substrate on which a soft magnetic layer and a perpendicular magnetic recording layer are stacked. The magnetic head 14 is positioned at a desired track 21 on the recording medium 13 by a positioning mechanism 22 in accordance with an instruction received by a positioning circuit 20 from the controller 18 under the control of CPU 19. Then, the magnetic head 14 carries out recording or reading of magnetic information on the desired track.

Figure 4:
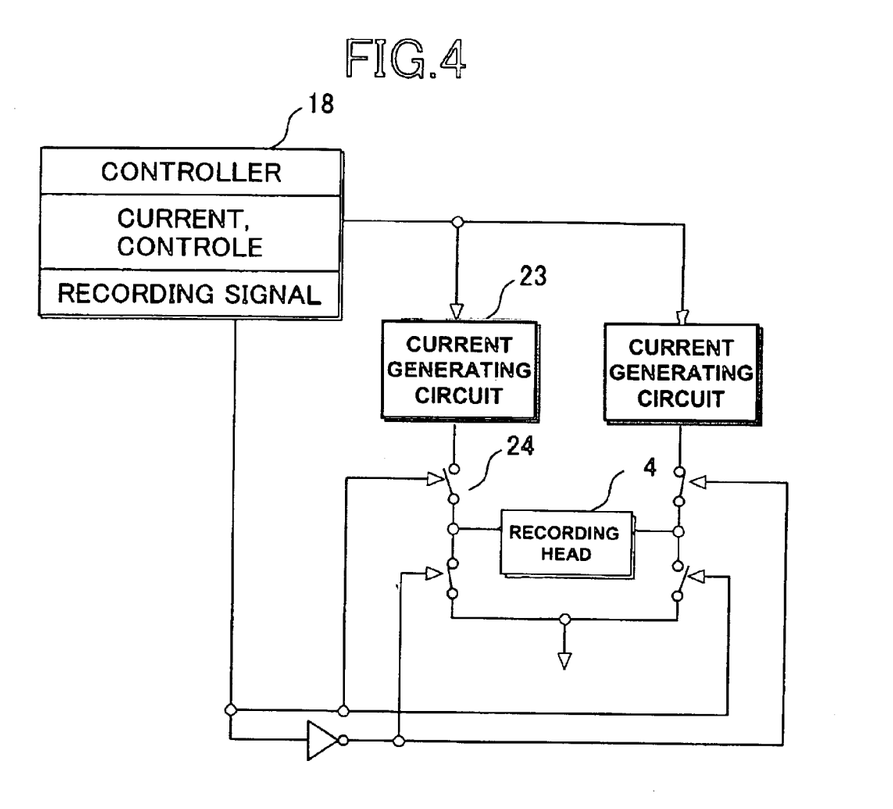
FIG. 4 shows a schematic diagram of a recording current driver circuit.

FIG. 4 shows a circuit block diagram of the recording driver. Prior to the start of recording operation, the controller 18 sets the pulse amplitude and time length of the recording current, and an asymptotic value of the current amplitude following the pulse waveform, in the current generating circuit 23. A switch 24 is controlled in accordance with a recording signal giving the time length of the recording pattern, whereby the polarity is inversed and a rising recording current is supplied to the recording head 4.

Figure 5:
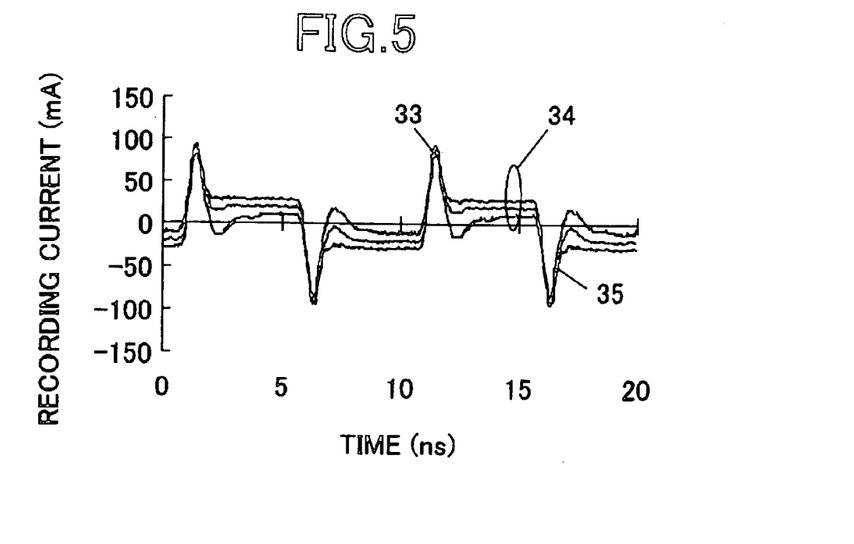
FIG. 5 shows current waveforms with various current amplitudes of the asymptotic value.

Using the magnetic recording apparatus shown in FIGS. 3 and 4, magnetic recording was carried out. FIG. 5 shows the current waveform used during the recording. The recording current waveform, which was measured by inserting a transformer-type current measuring probe between a head mounting terminal in the transmission line and the head terminal, has a waveform close to the waveform of the current flowing the recording head coil. As shown, in the recording current waveform, the current amplitude in the interval between the fall of a first current pulse 33 and the rise of a subsequent second current pulse 35 is asymptotic to a constant current value 34. In FIG. 5, multiple current waveforms used in the recording are shown in a superposed manner. The waveforms have an equal amplitude in the current pulse portions and different asymptotic values 34 of the current amplitude following the pulse waveforms 33 and 35.

Figure 6:
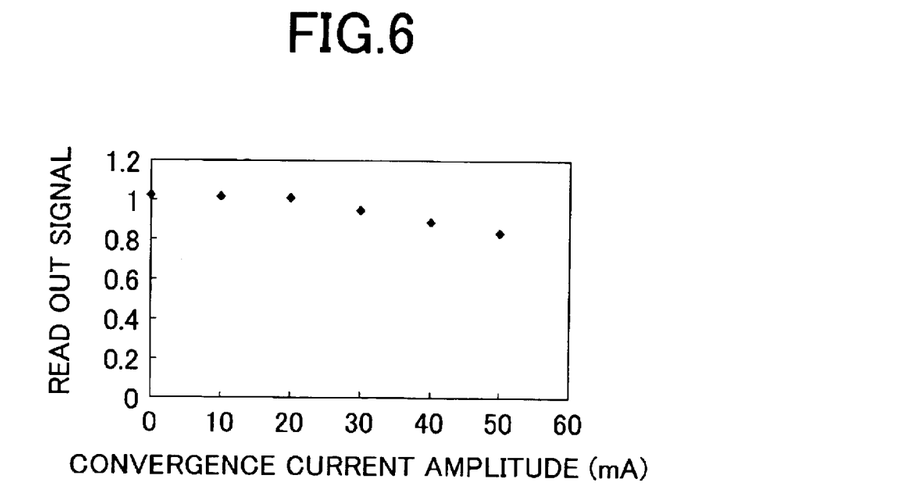
FIG. 6 shows the relationship between the current amplitude of the asymptotic value and the normalized readout output.

FIG. 6 shows the relationship between the readout output and the asymptotic value of the current amplitude when a recording was conducted using these various current waveforms. The lower the asymptotic value of the current amplitude, the greater the readout output which is more advantageous to recording. In the present configuration, the current amplitude required for forming a recording pattern in the magnetic recording medium is 20 mA. Thus, it will be seen that it is effective to make 0 mA, or not more than 20 mA, at which a recording pattern is formed, the asymptotic value of the current amplitude in the interval between the fall of the first current pulse forming one recording pattern of the current waveform to the rise of the second current pulse forming the subsequent recording pattern.

Next, magnetic recording was carried out at various recording frequencies, using the recording current waveform according to the invention and the conventional recording current waveform, and then the respective readout outputs were compared. In the present example, a current waveform determined on the basis of a write bubble size WB was used in the recording and reproducing mechanism. The write bubble size WB in the perpendicular recording system in the present embodiment was 400 nm. A head speed v was 40 m/s. The lowest recording frequency was 50 MHz and a maximum pattern time length T was 10 ns. A time length W of the recording current waveform was set to be 1 ns according to the condition W>T−WB/v, and the recording driver was set accordingly.

Figure 7:
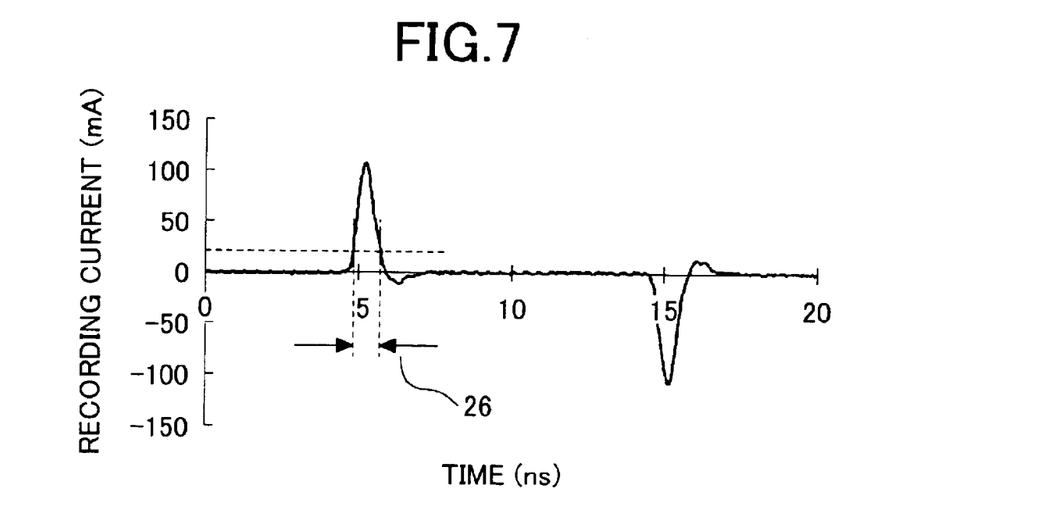
FIG. 7 shows the recording current waveform according to the invention.
Figure 8:
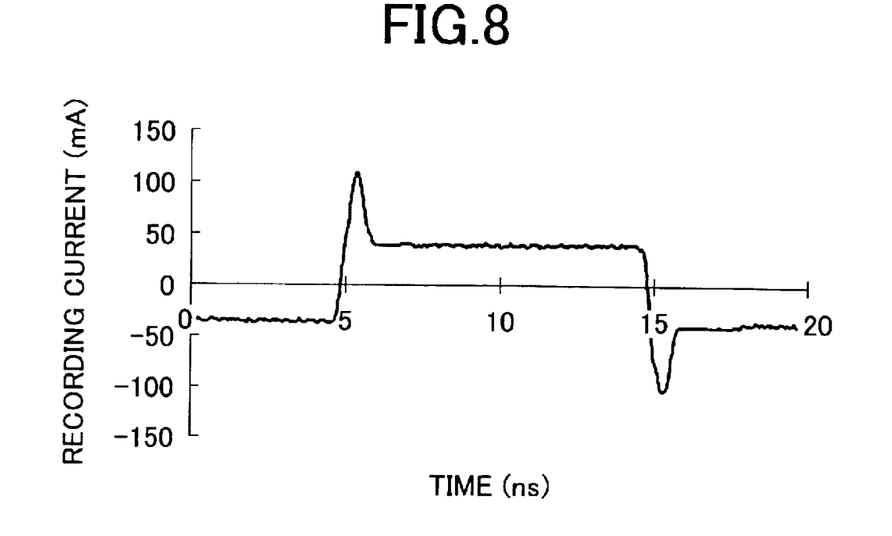
FIG. 8 shows the conventional recording current waveform.

FIG. 7 shows the current waveform in the present embodiment. The frequency is 50 MHz. In response to the recording data signal, the recording current rises from 0 mA, reaches a peak of 110 mA, and then decays. There is an undershoot in the current waveform, so that the waveform once drops below zero and then becomes asymptotic to 0 mA. In the present configuration, the current amplitude at which the recording pattern is formed is 20 mA, and a time length 26 of the recording current waveform exceeding this current value is 1 ns. The conventional current waveform is shown in FIG. 8, which rises from a negative amplitude, exhibits an overshoot, and is then maintained at an amplitude of 40 mA. Magnetic recording was conducted using both current waveforms and the respective recording characteristics were compared.

Figure 9:
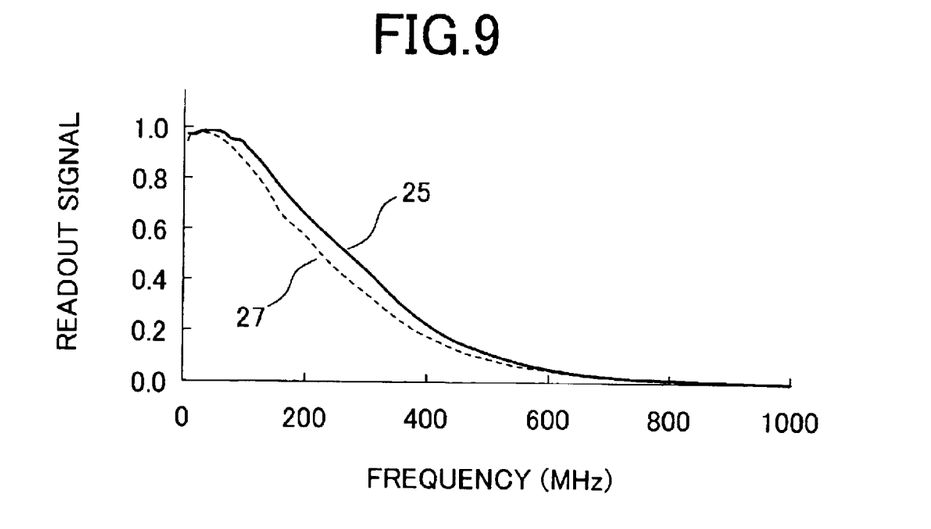
FIG. 9 shows the current waveform-dependency of the recording readout signal output.

FIG. 9 shows a graph plotting the readout output against the recording frequency in the case where recording was conducted by varying the recording frequency. The higher the frequency, the smaller the recording interval, resulting in a superposition of the boundary regions of the recording patterns and a reduction in the readout output. Thus, the degree of decrease is smaller when the current waveform 25 in the present invention is used, so that a greater readout output can be obtained in high frequencies than in the case of using the conventional current waveform 27. Accordingly, it can be confirmed that the current waveform of the invention is more effective for high-density and high-frequency recording.

Thus, in accordance with the invention, high-density and high-frequency recording can be achieved without requiring modifications in the magnetic characteristics of the recording medium or the structure of the recording head, or reductions in the distance between the magnetic head and the magnetic recording medium.

What is claimed is:

1. A magnetic recording apparatus comprising:
   a magnetic head mounting single pole head having a main role and an return pole;
   a magnetic recording medium having a magnetic recording layer in which a magnetic pattern is recorded using the single pole head;
   a motor for rotating the magnetic recording medium; and
   a recording driver for supplying a recording current to the single role head, wherein the current waveform of the recording current supplied from the recording driver to the single pole head includes a first pulse exceeding a current amplitude at which the magnetic recording medium can be recorded, and a second pulse of the opposite polarity to that of the first pulse, the second pulse exceeding the current amplitude at which the magnetic recording medium can be recorded, wherein the current value between the first and second pulses is smaller than the recordable current amplitude,
   wherein a relationship T>W>T−WB/v is satisfied, where W is the time in which the first and second pulses exceed the current amplitude at which the magnetic recording medium can be recorded, T is the time length of the recorded pattern, v is a relative transport speed of the magnetic head in the track direction of the magnetic recording medium, and WB is a write bubble size.

2. The magnetic recording apparatus according to claim 1, wherein the current value between the first and second pulses passes through 0 mA and becomes asymptotic to 0 mA.

3. The magnetic recording apparatus according to claim 1, wherein the current value between the first and second pulses passes through an intermediate value between a peak current value of the first pulse and a peak current value of a second pulse and becomes asymptotic to the intermediate value.

4. A magnetic recording method for recording information on a magnetic recording medium by forming a magnetic recording pattern using a single pole head comprising a main role and a return pole, comprising the steps of:
   supplying a first pulse current to the single pole head, the first pulse current exceeding a current amplitude at which the magnetic recording medium can be recorded; and
   supplying a second current pulse to the single pole head, the second current pulse having an opposite polarity to that of the first pulse and exceeding the current amplitude at which the magnetic recording medium can be recorded, wherein
   the current value between the first and second pulses is smaller than the recordable current amplitude,
   wherein a relationship T>W>T−WB/v is satisfied, where W is the time in which the first and second pulses exceed the magnetic recording medium-recordable current amplitude, T is the time length of the recording pattern, v is a relative transport speed of the magnetic head in the track direction of the magnetic recording medium, and WB is a write bubble size.

5. The magnetic recording method according to claim 4, wherein the current value between the first and second pulses passes through 0 mA and becomes asymptotic to 0 mA.

6. The magnetic recording method according to claim 4, wherein the current value between the first and second pulses passes through an intermediate value between a peak current value of the first pulse and a peak current value of the second pulse, and becomes asymptotic to the intermediate value.

* * * * *